United States Patent [19]
Barnes

[11] 3,872,222
[45] Mar. 18, 1975

[54] PROCESS FOR PRODUCING METAL SULPHIDE CRYSTALS

[75] Inventor: Hubert L. Barnes, State College, Pa.

[73] Assignee: Crysdyn Corporation, Washington, D.C.

[22] Filed: Oct. 1, 1970

[21] Appl. No.: 77,359

Related U.S. Application Data

[63] Continuation-in-part of Ser. Nos. 249,136, Jan. 3, 1963, abandoned, and Ser. No. 697,017, Jan. 11, 1968, abandoned.

[52] U.S. Cl.................. 423/561, 423/562, 23/300, 23/301, 23/305
[51] Int. Cl..... C01g 13/00, C01g 9/08, C01b 17/20
[58] Field of Search ............ 23/134, 135, 138, 300, 23/295, 301, 305; 423/562, 561

[56] References Cited
UNITED STATES PATENTS
3,058,807 10/1962 Holland ........................... 23/135 X

OTHER PUBLICATIONS

Journal of the American Chemical Society, Vol. 76, Apr. 20, 1954, pages 2,182–2,184.

*Primary Examiner*—Edward Stern
*Attorney, Agent, or Firm*—Brisebois & Kruger

[57] ABSTRACT

Single isometric metal sulphide crystals suitable for use as semiconductors, phosphorus electroluminescents and radiation detectors and a method of forming them comprising crystallizing the metal sulphide from crystallizing solutions containing metal bisulphide complex ions, $HS^-$ ions and an excess amount of metal sulphide ions, having a pH of 6-14.

20 Claims, No Drawings

PROCESS FOR PRODUCING METAL SULPHIDE CRYSTALS

This application is a continuation-in-part of application 249,136 filed Jan. 3, 1963, which has been abandoned, and application 697,017 filed Jan. 11, 1968, which has been abandoned.

This invention relates to the production of highly pure, oriented or single isometric metallic sulphide crystals that have a relatively stress-free orientation of the metal sulphide molecules in the crystal lattice that are suitable for use as semiconductors, and as highly efficient phosphorescent and luminescent materials.

Methods now in use for the growth of metallic sulphide crystals depend upon the use of high temperatures (above 300°C) and involve melts, vapors, or various compositions of hydrothermal systems. However, high temperatures, such as temperatures above 1,025°C, used in the melt and vapor methods of crystallization are inherently undesirable because high levels of thermal energy statistically generate imperfections in sulphide crystals in several ways including irregular stacking of the polymorphs, spiral dislocations, and strain introduced in cooling hexagonal form that exists at the high temperature to the desired isometric form that exists at lower temperatures. The prior art metal sulphide crystallizing solutions, suitable for laboratory or commercial use, cannot dissolve metallic sulphides at moderate temperatures in sufficient quantities to act as a suitable crystallizing medium for crystal growth.

Due to the low vapor pressure of zinc sulphide, these crystals are now grown from the vapor phase with success only above about the temperature 1020°C; at this temperature the isometric zinc sulphide changes to the hexagonal form. Subsequent cooling even when made gradually over long periods of time produces strained and imperfect isometric crystals of little usefulness.

It is known that the reaction: $H_2S + NaOH = Na^+ + HS^- + H_2O$ does not generate $Na_2S$ or $Na_2S_x$. Except for HgS, the sulphides, ZnS, PbS, etc., are virtually insoluble in $Na_2S$ and crystal growth is impractical in these solutions. In addition, the alkali polysulphide solutions fix the sulfur fugacity so that the concentration of defects is outside the range desirable for semiconductor uses of the base metal sulphides. The distinction between bisulphide and sulphide or polysulphide is important; until the discovery of the present invention, crystallizing solutions suitable for forming metal sulphide crystals, in the laboratory or commercially, from equilibrium bisulphide complex solutions of the desired metal sulphides were not available.

Another disadvantage of the prior art noted above, of the sulphides of interest here, only HgS is known to be soluble in $Na_2S$ solutions. In the alkali metal hydroxide solutions, ZnS forms a zincate complex at pH's above about 13 but other metallic sulphides are not soluble in such solutions and doping cannot be done simultaneously with crystal growth.

In spite of the many prior art attempts over a long period of time to produce stress-free, pure metal sulphide crystals, such crystals have not been successfully produced. Moreover, the metal sulphide crystals that have been geologically produced under small gradients that have remained constant for thousands of years are neither pure enough nor crystallographically perfect enough for commercial use as phosphors, luminescents, fluorescents or semiconductors.

Commercial production of crystals requires that necessary gradients of temperature, pressure, oxidation state, pH and dilution are within ranges which can be precisely controlled. It is more expensive, and quite difficult, to maintain either very large or very small gradients for the hours or days needed for crystal growth by each method except by temperature gradients.

There are several well known uses for metallic sulphide crystals produced by the process of this invention which are related to their being either small crystals less than 1mm to as small as 25 microns in dimensions, crystals smaller than 25 microns have few, if any, practical uses — the most practical small crystals are 0.1 mm to 1 mm in size — or large crystals greater than 1 mm in 2 dimensions. The small crystals such as zinc sulphide crystals can be used for luminescent coatings and dispersions and are presently manufactured by a two-step process involving precipitation near room temperature followed by heating for a period at 800°–1100°C in the presence of appropriate doping materials which diffuse into the crystals.

Large crystals are useful for a number of applications including infra-red measurement, radiation measurement (scintillation detector), electro-optical shutters, piezoelectric crystals, and various luminescent uses.

The small crystals of this invention can be used to produce a much brighter and purer color on colored television screens. In general these crystals are superior phosphorescent, luminescent and fluorescent materials. They can be used in lights, to light sections or entire walls, etc.

The larger crystals of this invention display the Pockels Effect, which is similar to the Kerr Effect displayed by a few liquids. They are completely transparent in the absence of an electric field. An electric field splits and polarizes the light in two directions and the crystals become opaque. This property will allow the use of crystals of one-fourth inch or more, such as ZnS, as an effective optical shutter which has no moving parts and which can take pictures at any speed obtainable that are precisely timed electronically.

The crystals of this invention can be used to detect and measure alpha, beta and gamma rays which cause a light flash in the crystals. They can also be used to detect and measure infra-red waves which produce a photoconduction current in crystals, such as ZnS crystals, that is exactly in linear proportion to the radiation level.

Among the properties of these crystals that are superior to those now available commercially (from melt or vapor growth) include:

1. they are single crystals that are untwinned;
2. they have a much more uniform composition and better, more uniform semi-conductor properties;
3. they are unstrained crystals which have not been grown as one polymorph and cooled to form another;
4. they have combined high purity and large size shown by their being colorless and by x-ray and electron microprobe analyses; and
5. they can be grown as uniformly doped crystals in a single step without first growing a crystal followed by heating it above 800°C to slowly diffuse a doping agent into the crystal.

It is an object of the present invention to produce doped and undoped single isometric metallic sulphide crystals which do not pass through a phase change on coating which are of an appropriate size for their specific use.

Another object of this invention is to provide a crystallizing solution suitable for crystallizing and growing metal sulphide crystals.

Another object of this invention is to provide a process for doping materials to be coprecipitated in a single step process potentially allowing greater concentrations of activators with more intense luminescence and at lower manufacturing cost.

Other objects of this invention include a method of producing high purity single metallic sulphide isometric crystals; a method of producing metallic sulphides containing controlled quantities of doping material; and a method for forming crystalline sulphides at relatively low temperatures, such as below 300°C, although temperatures as high as approximately 1000°C could also be used.

The crystals produced by this invention are grown from a crystallizing solution that preferably contains metal bisulphide complex ions, HS ions, metal sulphide nutrient and having a pH of 6–14. The crystallization solution is maintained in a chemical reversible reaction equilibrium either in the presence or absence of an activator or dopant depending on the desired luminescent or semiconductor quality desired, under a gradient that encourages the crystallization and growth of the metal sulphide. The crystallizing process of this invention makes possible the growth of nearly perfect single crystals of metal sulphides, such as zinc sulphide, which are unobtainable by prior art processes of forming metal sulphide crystals.

This invention is based on the discovery that metal sulphides, such as ZnS, in aqueous solutions having a pH of approximately 6–14 form stable, soluble metal sulphide complex ions that will react or dissociate under a gradient in the equilibrium solution to form highly pure stress-free metal sulphide crystals. In aqueous solutions, which also contain $H_2S$ and $HS^-$, the following reaction takes place $ZnS(s) + H_2S(aq) + HS^- \rightleftarrows Zn(HS)_3^-$ where the effective equilibrium constant (in terms of moles per 1,000 grams solvent) is roughly $10^{-3}$ at 25°C., and the ionic strength is approximately one. Other zinc bisulphide complexes form with variations of pH, concentration and temperatures, but they all react under the crystallizing gradient to form the zinc sulphide crystals.

This zinc bisulphide complex, together with other stoichiometrically and structurally related zinc bisulphide complexes, and other metal bisulphide complexes are stable over at least the tested range of 25 to 750°C and 1 to 1000 atmospheres. Higher temperatures and pressures may be used, but there is no need to do so. Aqueous solutions saturated simultaneously with a strong base that will maintain the required pH range and hydrogen sulphide dissolve up to several grams per liter of ZnS are preferred. The overall result of the reaction is that the non-crystaline metal sulphide nutrient raw material is converted into the metal sulphide crystal. The other reactants are continually present in the reaction and they may be reused.

The rates of reaction of the metal bisulphide complexes indicate very rapid equilibration, within a few minutes, on either dissolving or depositing sulphides. I have found that by using the process of this invention, crystals can be grown with only minor changes in conditions or in the chemical potential gradient and much more closer to true, reversible equilibrium than was heretofore possible. In general, the quality of a crystal generally improves greatly under conditions where smaller changes in free energy are involved. The smaller the increment in the chemical potential gradient during crystal growth, the better the quality of the crystal.

I found that five types of chemical changes or chemical potential gradients can be used to reduce the activity of the $HS^-$ ion, to initiate the metal sulphide crystal formation and to maintain the metal sulphide crystal growth from the crystallizing solution; they are dilution, acidification, decrease in pressure, oxidation, and decrease in temperature. In practice, each of these chemical potential gradients is related to the others and cannot be independently pursued without concommitant changes in the other gradient variables. In an experiment where an abrupt decrease in pressure was the initiating event, small, pure, white crystals of the desirable isometric form of ZnS were grown in seconds. The speed and ease of crystal formation and crystal growth was very unexpected.

Another aspect of this invention is the growth of perfect single crystals from the equilibrium metal sulphide-rich solvents that contain bisulphide ions and metal sulphide complex ions using combinations of the chemical potential gradients.

The bisulphide-containing crystallizing solution must have, at a reference temperature of 25°C., a pH between 6 and 14. The pH of any solution changes with temperature so these pH limits are restricted to this one reference temperature, but this reference temperature is not absolutely critical since, relative to neutrality, the same pH range has approximately the same effect on the metal sulphide solubility at higher temperatures. Higher temperatures usually slightly reduce the pH of the solution.

The bisulphide solution must be saturated or supersaturated in the metallic sulphide in order to deposit metal sulphide crystals. The solution does not have to be saturated with the $HS^-$ ion (obtained from NaHS, KHS, etc.) or with $H_2S$ or with the metal bisulphide complex, although the crystallizing process improves with higher concentrations of these aqueous species. The crystallizing solution must either be one in which at the reference temperature of 25°C (1) at a pH above 7 the bisulphide ion ($HS^-$) is the predominant sulfur-containing aqueous species in solution, or (2) at a pH between 6–7 hydrogen sulphide is predominant but the bisulphide ion concentration is not less than 1/10 of the $H_2S$ molar concentration in the solution. These solution concentrations (1) and (2) may be achieved by adjusting the pH in many ways, such as by reacting $H_2S$ plus alkali hydroxides in aqueous solutions, by simply dissolving an alkali bisulphide salt, by reacting $H_2S$ or an acid with an alkali sulphide in solution, or by any combination of these processes. The crystallizing solution, however, must have the characteristics noted in (1) and (2) above after equilibrium is achieved at the reference temperature of 25°C and the critical characteristics (1) and (2) also apply at other temperatures. Maintaining this bisulphide concentration and pH are critical for crystal growth. When the pH falls below 6 and when the bisulphide concentration falls below that specified in (1) and (2) most of the crystal growth stops. The crystal growth, if any, below a pH of 6 is insignificant.

To clarify the pH range under which bisulphide complexes are effectively formed the following diagram shows the relative importance of $H_2S$, $HS^-$, and $S^{2-}$ versus pH. "Activity" is simply thermodynamic concentration. At pH 6, $HS^-$ is at 0.1 (or log activity $= -1$) relative to 1 (or log activity $= 0$) for $H_2S$. At pH 14, HS is about 0.1 times the $S^{2-}$ concentration also. If the total sulphide concentration is increased to, say 10 molal, then the shape of the diagram remains unchanged and only the values of log activity increase by +1, so that 0 becomes +1, −5 changes to −4, −10 to −9, etc. In other words, the concentration of $HS^-$ relative to $H_2S$ and $S^{2-}$ changes only with pH. Note also that the concentration of $HS^-$ equals $H_2S$ at pH 7 and also equals $S^{2-}$ at approximately pH 12.9. This diagram is correct for the reference temperature of 25°C. to which we refer all pH values. Because this diagram and pH's of solutions change in complex ways as temperature increases, a reference temperature is required.

Cd, Cu, Pb, Hg, Ag, Au, Sb, As, and Fe are presented on pages 353–369. Here, the equilibrium constants governing many of the complexing reactions are available and the amounts of the reactants needed for the reaction as well as equilibrium solubilities can be calculated from them. In many of the experiments described in this passage, equilibrium concentrations were of the reactants determined by measuring solubilities after successive time intervals until a constant solubility was found.

From a practical standpoint the bisulphide ion ($HS^-$) concentration should exceed .01 molal. A .01 molal $HS^-$ solution forms a metal sulphide solution containing $10^{-5}$ molal of the metal sulphide and this concentration of metal sulphide in solution is very small and the crystallizing process is therefore very slow at this $HS^-$ concentration.

For faster and more commercial crystallizing reactions, one should use approximately 5 to 10 molal $HS^-$

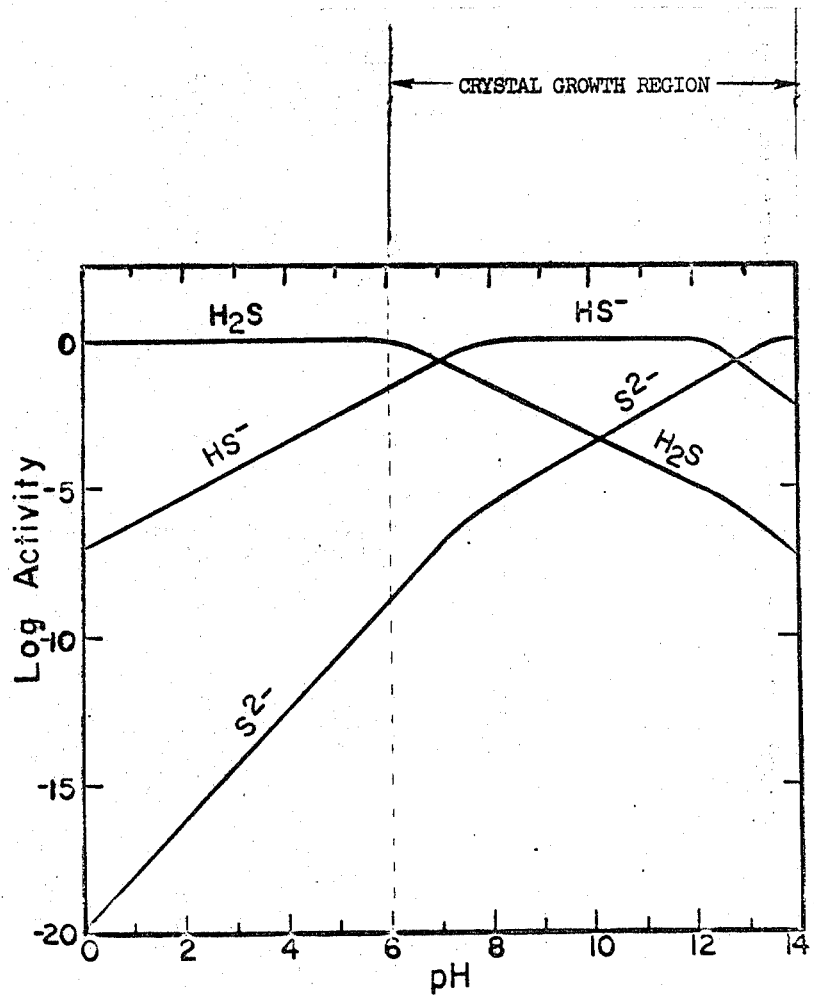

The rate of reaction in dissolving the metal or metal salt in the bisulphide solution is very fast, being complete in minutes. The dissolving of salts to form the bisulphide solution is similarly fast. Only the process of crystallizing the metallic sulphides is not fast, and it typically takes a few hours, days or months, depending on the metal sulphide, the size, the perfection of crystals desired, the temperature and other conditions involved. The rapidity of equilibration rates of bisulphide solutions with metallic sulphides is documented in the book "Geochemistry of Hydrothermal Ore Deposits" published by Holt, Rinehart, and Winston and edited by the applicant. Pertinent material on sulphides of Zn, solutions which have a pH of 7–9.

The process of this invention can be used to form any metal sulphide which forms a correspondingly stable bisulphide complex. For example sulphide crystals of the following metals: V, Fe, Co, Ni, Cu, Zn, Ga, As, Mo, Cd, Ag, In, Sn, Sb, Au, Hg, Tl, Pb and Bi can be formed using this process.

The metal salts used to form the metal sulphide nutrient in this process may be of many different compositions because these salts and the metals are converted to the sulphides as they react and dissolve in the presence of excess bisulphide ions in solution. It is more efficient to use metallic sulphides, non-crystalline or finegrained, as the metal sulphide nutrient for the process in order to conserve high concentrations of $H_2S$ and $HS^-$; however, the actual nutrients are metallic sulphides, whether originating by being directly added to the system or by being formed by the reaction of other salts or metals with the sulphide solution of the crystal-growing system.

An aqueous zinc bisulphide solution which is used as a solvent for crystallizing the zinc sulphide can be prepared from a variety of components which must react to give the three ions in equilibrium solution having a pH at the reference temperature of 25°C between 6 and 14. The desired pH may be achieved using any of the common bases, such as sodium hydroxide, potassium hydroxide, etc.; the $HS^-$ ion may be formed from gaseous hydrogen sulphide or salts of bisulphide or a soluble sulphide. The zinc sulphides can be formed from any of the zinc salts or from the native zinc metal. Optimum compositions have been found to be very pure solutions saturated simultaneously in sodium hydroxide, hydrogen sulphide and zinc sulphide with a pH between 7.5 and 9, at 25°C.

The very pure crystallizing solutions that produce the highest purity crystal are made by using, for example, a zinc sulphide produced by reacting a zinc and sulfur that is 99.999 percent pure and conductivity grade or very pure water.

When less pure reactants are used, in general the crystallizing process of this invention produces metal sulphide crystals that are much purer than the reactants in the crystallizing solution because the impurities usually do not enter the crystal structure.

Activators, such as copper sulphide, aluminum chloride and others which are soluble in bisulphide solution can be added to the solution to produce a luminescent band if luminescent crystals are desired.

Aven and Prener, 1967, "Physics and Chemistry of II-VI Compounds," Wiley, page 441 lists a number of suitable activators or dopants. Activators of ZnS, for example, and other metal sulphides may include either omission of some Zn or S atoms from the crystal lattice or by forming a solid solution of the ZnS that can contain Cd, Cu, Ag, Au, P, As, Hg alone or in combination with Cl, Br, I, Al, Ga, In, Sc, Se, Te, etc.

The process of this invention has been used to form activated crystals by the addition of activators, such as Cu and Cd, and the omission of Zn and S atoms. Other activators can also be used in the process of this invention.

Reaction vessels used to contain the solution must be highly corrosion resistant to prevent contamination of the solution. Although at high pressures stainless steel by itself has been found to be inadequate, heavy chrome plating or a lining with platinum or tantalum provides a sufficiently corrosion resistant vessel to be used throughout the desired temperature and pressure range. Such a reaction vessel has been described by the inventor in the Annual Report 1957-58 (No. 57) of the Carnegie Institution of Washington; the experimental techniques involved in growing crystals in such vessels have been explained by the inventor in the same publication and in more detail in the journal, Economic Geology, Volume 58 pages 1054-1060 (1963). Although the reaction vessel and associated apparatus is a unique adaptation of previously described design principles, the general techniques of adding and removing chemicals have been in general use.

For the growth of small crystals, glass containers are satisfactory where temperatures need not exceed A typical charge for a reaction vessel having 1123 millimeters capacity would be:

| Sodium hydroxide | 240.3 | grams |
|---|---|---|
| Zinc Sulphide | 83.73 | grams |
| Water (de-ionized) | 605.87 | grams |
| Hydrogen sulphide | 220.45 | grams |

This is placed in a reaction vessel, heated to a temperature of 200°C for 150 hours, and the hydrogen sulphide maintained under a pressure of 40 atmospheres gauge. The solubility of zinc sulphide in aqueous medium is disclosed in the Annual Report of the Carnegie Institution 1958-59 (No. 58) and in the Annual Report of 1959-60 (No. 59) by the inventor.

Solutions containing zinc bisulphide or other metal sulphides may be used to produce crystals of zinc sulphide or other metal sulphides by a number of different methods. That is, by the use of Thermal gradients, by lowering the pH of the solution or controlling the equilibrium.

Small crystals can be grown in the aqueous bisulphide solutions within a wide temperature range, using any chemical potential gradient means of reducing the chemical activity of the $HS^-$ ions and consequently effecting the stability of the zinc bisulphide complex.

The crystallizing conditions described below are representative of many experiments, during each of which several temperatures were maintained usually 25°, 75°, 125° and 200°C for variable intervals. The rate of solution was fast, reaching equilibrium within 30 minutes at any of these temperatures.

Our tests have shown that the size of the crystals formed is a function of time and that the same methods which produce small crystals if given sufficient time, will produce large ones.

The techniques of using the chemical potential gradients acidification, temperature gradients, oxidation, dilution, pressure quenching described below in the illustrative examples are the same as those commonly used in the art of growing other types of crystals. Many of these techniques are described in texts on the subject, such as Buckley (1951) "Crystal Growth," Wiley; Gilman (1963) "The Art and Science of Growing Crystals", Wiley; or the publications of the several "International Conference on Crystal Growth," such as that edited by Peiser (1967), Pergamon Press. All of these gradients can be used to grow small or large crystals.

In all cases the chemical potential gradient causes the metal bisulphide complex ions to decompose and form more metal sulphide in the solution that is already saturated with the metal sulphide. This causes crystal formation and crystal growth.

PRESSURE QUENCHING

Using a small sample of the typical charge described above, crystals have been growing successfully, using an abrupt drop in pressure of about 50-1000 atmospheres, at temperatures between 25°C and 750°C.

The pressure drop quickly produced small isometric crystals that were easily resolved with a microscope and had a size of about 20-50 microns. If desired the crystallizing solution may contain activators, such as copper sulphide, sodium chloride etc.; on crystallizing the solution these materials are contained within the crystal structure and such crystals are suitable for luminescent use.

With reaction vessel at 102.0°C and 141 p.s.i.g., 5.24 ml. of the charge solution was extracted into an open beaker. The resulting white crystals which were ana- Crystals larger than 0.1 mm can be grown using the pressure quenching technique.

Pressure quenching can be accomplished in a single chamber or vessel or in a series of chambers that are maintained at a series of lower pressures. In the latter case the solution is passed through the chambers in series and the crystals grow continuously on the walls of each chamber at the orifices where the pressure drop occurs.

ACID QUENCHING

Small isometric crystals were successfully grown by starting with the metal sulphide saturated, bisulphide solution of zinc having a pH of about 6 to 14 and reducing the pH to below 6 by adding any mineral acid such as HCl, HBr, HNO$_3$, etc. Practically all of the crystal forms as the pH approachese 5.9.

In a reaction vessel at 25°C and 100 p.s.i.g., 10.48 ml of the charge solution described above was placed in an open beaker and acidified to a near neutral pH with HCl that was added to the solution at one time. The white crystals that formed were X-rayed. The crystals were isometric ZnS with no lines indicating hexagonal crystals. The size of the crystals produced was about 10–50 microns.

In general, crystal growth can be accomplished at pH's below 7, but above or near 6. The pH of a bisulphide solution can be lowered below 7 at 25°C by addition of sufficient H$_2$S and that solubilities of the sulphides are adequate for crystallizing in such solutions; however, optimum conditions for greatest solubility are achieved in weakly alkaline solutions with pH's between about 8–10. At a pH below 6 there is no noticeable crystal growth. If the pH is below 2 the solution will dissolve the metal sulphide crystals that formed during the acid quench.

If one desired larger crystals the acid should be added to the crystallizing solution at a slower rate. The slower the acid addition rate the larger the crystals that are produced during acid quenching.

OXIDATION

When a saturated metal sulphide, bisulphide solution is allowed to stand exposed to the air for several days slow oxidation occurs with the resulting growth of isometric zinc crystals.

For example, a composition containing 47.03 g. ZnS, 112.00 g. H$_2$S, 97.00 g. NaOH, and 600.60 g. H$_2$O was prepared. The resulting solution was sampled at a variety of temperatures and pressures to insure ZnS saturation and then about 75 ml. of the clear, light yellow bisulphide solution was stored in a 125 ml. pyrex bottle which was stoppered but not tightly to allow limited diffusion of air into the bottle at room temperature. Thirteen days later solid particles were filtered off. X-rays showed the particles were crystals of isometric ZnS with no lines observed for the hexagonal form. Microscopic examination showed a very uniform but small grain size with sharp reflections observably from crystal faces proving, as did the sharp X-ray peaks as well, that the particles were a well-crystallized product.

Larger crystals can be formed by extending the oxidation period or by using an oxidizing agent that gradually breaks down such as manganese oxide, ferric oxide, oxalic acid, etc.

The use of oxalic acid as the oxidizing agent has another advantage since it is a compound that slowly reduces the pH crystals are formed by acid quenching in combination with oxidation.

DILUTION

The effective equilibrium constants have been determined for the crystallization from bisulphide solutions (Geochem. of Hydrothermal Ore Deposits, Ch. 8). Because the effective equilibrium constant or solubility of ZnS increases with ionic strength by a factor of about four when the zinc bisulphide solution is saturated with ZnS, dilution of the solution to reduce the concentration of HS$^-$ can be used as a crystallization mechanism to remove up to 75 percent of the ZnS dissolved in the bisulphide solution. This effect of ionic strength dilution is not related to the type of ions involved. NaCl and other ion-forming components have a similar effect on crystallizing. The relative size of the crystals can be controlled by modifying the ion dilution rate. The slower the rate of ion dilution the larger the size of the crystals that are produced.

Of the five methods of depositing small crystals — pressure quenching, acidification, oxidation, dilution and temperature gradient, the temperature gradient is the most efficient to use in the controlled production of perfect crystals.

TEMPERATURE GRADIENTS

Large isometric crystals, having a size of up to about 3 mm, were grown using thermal gradients of 5° to 300°C. but preferably a gradient of 10° to 30°C., where the hot end of the reaction vessel is maintained between 250°C and 1,000°C. The temperature gradient method of forming crystals and the apparatus used to carry out this method are well known in the art. For example, a specific thermal gradient process is described in the above cited "Economic Geology" reference. The method described in this reference is only one of many thermal gradient crystallizing processes that have been in common usage for many years. The design of the vessel is described on page 3, lines 6–9. The pressures required are those necessary to maintain a fluid density greater than 0.3 grams per cubic centimeter in the presence of a small excess of hydrogen sulphide at the given pH of the crystallizing solution. Crystals two millimeters in dimension have been grown in three days with a thermal gradient maintained between 350°C and 380°C using as a solvent H$_2$S-saturated sodium sulphide solution containing zinc sulphide.

In another temperature gradient crystallization test a saturated solution of reagent grade Na$_2$S.9H$_2$O was made using de-ionized water; into this solution H$_2$S was bubbled until the pH dropped to about 10. This formed a sodium bisulphide solution. About 6 mls of this solution and 2 g. of ZnS were placed in a graphite-lined Morey-Type reaction vessel which had a capacity of about 20 cc. A temperature gradient was maintained between 495° and 525°C for 62 hours then the vessel was cooled, opened, and the crystals which grew on the colder end of the vessel were examined under a microscope. The grain sizes were variable and approximately 1 mm. in two dimensions, untwinned, and apparently of good quality but tinged brown by a trace of iron diffused from the bomb walls. Experiments were performed in the same manner using a gradient between 350°C and 380°C but with about 50 g. Na$_2$S.9H$_2$O per 100 ml. H$_2$O, or NaCl, or (NH$_4$)$_2$S solutions and also with ZnCO$_3$ as the starting material crystals formed but the results of these experiments were much less satisfactory from a commercial viewpoint.

In experiments containing saturated lead, iron (FeS$_2$) zinc, mercury (HgS), and copper (CuS) sulphides in equilibrium with a 4.1 molar bisulphide solution, using various heating periods and temperatures up to 204°C and 360 p.s.i.g. each of the sulphides recrystallized to form an interlocking mass of crystals.

One composition containing 15.20 g. ZnS, 15.20 g. CuS, 10.90 g. PbS, 97.00 g. NaOH, 69.12 g $H_2S$, 8.97 g. $FeS_2$, 10.00 g. Hg, 1.60 g. S and 592.90 g. $H_2O$ was placed in a reaction vessel. After heating the reaction vessel at temperatures between 28.7° and 203.5°C at 48 to 358 p.s.i.g. during a period of approximately two months, the fluid was removed from the reaction vessel and the remaining crystals examined. A microscopic study confirmed the megascopic conclusion, on the basis of the interlocking crystals, that each of the sulphides had recrystallized at constant composition in response to temperature gradients under 10°C. X-ray examination confirmed that the crystalline minerals covellite (CuS), pyrite ($FeS_2$), cinnabar(HgS), galena (PbS), and sphalerite (Isometric ZnS) were produced.

Although recrystallization of the starting material was not complete, extensive overgrowths were apparent even on fragments over 3 mm. in two dimensions.

In another test using a composition containing 23.38 g. Fe, 97.00 g. NaOH, 93.15 g. $H_2S$, 26.10 g. S and 600.00 g. $H_2O$ after heating the vessel at 240°C. 700 p.s.i. for approximately one month, the solid was removed and X-rayed. The product was medium sized crystals of $FeS_2$. During the heating period, the temperature gradient favoring optimum crystal growth was 10° or less.

Crystalline cadmium sulphide was prepared in the same manner as crystalline zinc sulphide. Cadmium sulphide crystals are commercially important due to their use in photoelectric cells, in switches, light meters etc.

Sulphide crystals of zinc, cadmium, lead, mercury, silver, iron, cobalt, nickel and galena were grown in the same manner. Such crystals find extensive use in preparing fluorescent screens and as piezo electric semiconductors and use in other crystal and light sensitive applications.

The specific proportions in the compositions listed here and the pressures and temperatures may be varied and crystal growth still occurs as the following additional examples illustrate.

EXAMPLE 1

Mercuric sulphide crystals were grown using the following composition: 149.2 g. Hg, 51.8 g. S, 96.0 g. NaOH, 115.0 g. $H_2S$, and 600.0 g. $H_2O$. This composition was placed in a 1100 cc capacity pressure vessel. The reaction formed a bisulphide solution and HgS powder. The pressure reached 1200 psi when one end of the vessel was heated to 225°C and the other end of the vessel was heated to 200°C. After five days, the vessel was opened and hundreds of perfect cinnabar crystals having dimensions up to 3 mm. across had been grown on the cool end of the vessel. A very small percentage of the mercury had not reacted completely with the sulfur or with the solution to form mercury sulphide.

Under very similar conditions, CuS and $Ag_2S$ have also been crystallized from finely powdered sulphide or the metal plus sulfur.

EXAMPLE 2

The following crystallizing solution ingredients were placed in a 1.1 liter size reaction vessel and they were allowed to reach chemical equilibrium.

| | |
|---|---|
| ZnS | 84 g |
| $H_2S$ | 220 g |
| NaOH | 250 g |
| $H_2O$ | 606 g |

A 5 ml sample of this crystallizing solution was then placed in a crystalizer. The temperature was adjusted to 144°C and the pressure was adjusted to 190 psi. The solution was then simultaneously pressure quenched to 15 psi and temperature quenched to 25°C. This produced 12.6 mg of fine ZnS crystals.

EXAMPLE 3

5 ml of the same crystallizing solution prepared in Example 2 were placed in a crystallizer, the temperature was adjusted to 25°C, the pressure was adjusted to 100 psi. This solution was then subjected to a pressure quench to 15 psi. The crystals that formed were X-rayed and they were 100 percent sphalerite. There was no wurtzite present.

EXAMPLE 4

The following crystallizing solution ingredients were placed in a 1.1 liter size reaction vessel and they were allowed to reach chemical equilibrium.

| | |
|---|---|
| HgS | 12 g |
| CuS | 15 g |
| $H_2S$ | 89 g |
| NaOH | 97 gm |
| $H_2O$ | 598 gm |

5 ml samples of this crystallizing solution were placed in the crystallizer. At various temperatures up to 203°C (maximum temperature) and various pressures (maximum pressure 37 psi). Each of these samples at the various temperatures and pressures were then subjected to a 5°C thermal gradient. Cinnabar and covellite crystals formed which had a size of about 0.5 mm.

EXAMPLE 5

A crystallizing solution was formed in the manner described in Example 2 using the following ingredients.

| | |
|---|---|
| Zn | 47 g |
| $H_2S$ | 90 g |
| NaOH | 97 g |
| $H_2O$ | 601 g |

5 ml samples of this solution were placed in a crystallizer at a temperature of 25°C and a pressure of 15 psi. The mixture was allowed to slowly oxidize in the presence of air. X-ray and microscopic analysis showed that the product produced was small sphalerite crystals.

EXAMPLE 6

A crystallizing solution was formed in the manner described in Example 2 using the following ingredients

| | |
|---|---|
| HgS | 10 g |
| $H_2S$ | 156 g |
| NaOH | 96 g |
| $H_2O$ | 612 g |

5 ml samples of this solution were placed in a crystallizer at various temperatures up to 247°C (maximum temperature) and various pressures up to 575 psi (maximum pressure). Each of these samples at the various temperatures and pressures were then subjected to a temperature gradient of 10°C or less. Cinnabar crystals having a size of about 1mm were produced.

EXAMPLE 7

A crystallizing solution was formed in the manner described in Example 2 using the following ingredients.

| HgS | 170 g |
|---|---|
| $H_2S$ | 115 g |
| NaOH | 96 g |
| $H_2O$ | 600 g |

5 ml samples of this solution were placed in a crystallizer at temperatures of 200° to 225°C and a pressure of 1200 psi. Then the solutions were subjected to a 25°C temperature gradient for 7 days. Cinnabar crystals having sizes up to 3 mm were produced.

My experiments indicate that the large ZnS sphalerite crystals can be grown using NaOH + NaHS solutions of various sulphide concentrations. The optimum NaHS concentration range is 6–15 molal using a temperature gradient ($\Delta t$) of 10°–30°C at temperatures of 350°–550°C. The optimum pH is 7.5 to 9 for optimum crystal size; however, higher pH's are necessary to produce some semiconductor properties caused by reducing non-stoichiometrically the sulphide content of sphalerite.

EXAMPLE 8

To illustrate the optimum conditions for growing large ZnS crystals, crystallizing solutions containing ZnS nutrient, 6–15 molal NaHS, 6.2 molal NaOH were produced.

These solutions were placed in a crystallizer comprising sealed gold tubes having a 5 mm diameter and a length of 5–8 cm in a pressurized vessel. After 52 hours at 375°C, 1200 psi and under a 20°C temperature gradient, sphalerite crystals up to 3mm were grown.

These optimum ZnS crystallizing solutions are saturated with $H_2S$.

My experiments indicate that optimum conditions for growth of large cinnabar crystals (HgS) are the use of 150°–250°C temperatures using a 10°–30°C gradient, NaHS concentrations of 4–15 molal and a pH of 7–9. However, a higher pH is necessary to form crystals that have lower controlled sulphide content of cinnabar.

In all cases the optimum pH range for the growth of the metal sulphide crystals in the crystallizing solutions is the pH range in which the metal sulphide is most soluble in the $HS^-$ solutions. For example, since AgS and ZnS are less soluble in the 10–14 pH range, than in the pH range below 10, the lower pH range in which the metal sulphide is most soluble should be used.

All of the metal sulphide nutrients will form metal sulphide crystals in bisulphide crystallizing solutions that have the critical pH range and critical $HS^-$ concentration set forth above.

Those metal sulphides which have their highest solubility in the pH range above 9 in the crystallizing solution do not require the presence of dissolved $H_2S$. In this case the equilibrium reaction is illustrated by the following equilibrium reaction:

$$MS(s) + xHS^- \rightleftarrows MS(HS)_x^-$$

Illustrative examples of metal sulphide crystals that can be produced without using $H_2S$ are HgS, CdS, CuS and $Ag_2S$.

The metal sulphides that have a relatively low solubility in the pH range above 9 produce larger and better crystal yields when $H_2S$ is present in the crystallizing solution.

The use of crystallizing solutions which contain a mixture of metal sulphides in solution will more readily form a mixture of metal sulphide single crystals if a corresponding mixture of small seed crystals are present in the solution. At the end of the crystallization the seed crystals will be covered by the metal sulphide single crystal overgrowth.

If seed crystals are not used and if the crystallization is not conducted under very gradual gradient conditions the mixed metal sulphide solution will tend to produce interlocking crystals.

The $H_2S$ present in the crystallizing solution can be added as a reactant or it can be formed by the disassociation of the metal bisulphide complex which form $HS^-$ ions or the $HS^-$ already present in the solution will react with water to form $H_2S$ in accordance with $H^+ + HS^- \rightarrow H_2S$. The $H_2S$ can go off as a gas, for example, as the pressure drops, or it can dissolve in the aqueous crystallizing solution. The $H_2S$ that goes off as a gas helps deactivate the $HS^-$ ion by reducing its concentration and this increases the amount of metal sulphide crystal produced.

What is claimed is:

1. A method of growing single isometric metal sulphide crystals of high purity which have a dimension of 25 microns or more comprising:
   a. forming a saturated aqueous metal sulphide crystallizing solution that has a pH of 6 to 14 at a reference temperature of 25°C comprising compounds that form metal bisulphide complex ions, $HS^-$ ions, dissolved $H_2S$ and an excess amount of metal sulphide nutrient, in which (1) at a pH above 7 the $HS^-$ ion is the predominant sulfur containing ion in solution and (2) at a pH between 6 and 7 contains dissolved hydrogen sulphide which is predominant in solution but the $HS^-$ ion concentration is not less than 1/10th of the $H_2S$ molar concentration in the solution; and
   b. after said crystallizing solution reaches a chemical equilibrium between said metal bisulphide complex ion, said $HS^-$ and said metal sulphide, subjecting said crystallizing solution to a chemical potential gradient that causes the metal bisulphide complex ion to dissociate to form more metal sulphide which initiates the formation and the growth of metal sulphide crystals in the crystallizing solution.

2. The method of claim 1, in which said metal bisulphide complex ions are formed by reacting a reactant selected from the group consisting of a metal and a metal salt in an aqueous solution of hydrogen sulphide and a compound selected from the group consisting of an alkali hydroxide, an alkali sulphide or an alkali bisulphide.

3. The method of claim 1, in which said metal sulphide nutrient is zinc sulphide and said metal bisulphide complex ion is a zinc bisulphide complex ion.

4. The method of claim 3, in which the solution is saturated with $H_2S$, contains 6–15 molal of the $HS^-$ ions in solution and has a pH of 7.5 to 9.

5. The method of claim 4, in which the temperature is 350°–550°C and the temperature gradient is 10°–30°C.

6. The method of claim 1, in which said metal sulphide nutrient is a sulphide selected from the group consisting of V, Fe, Co, Ni, Cu, Zn, Ga, As, Mo, Cd, Ag, In, Sn, Sb, Au, Hg, Tl, Pb and Bi.

7. The process of claim 1, in which said chemical potential gradient is acidification.

8. The process of claim 1, in which said pH range is 7–9.

9. The process of claim 1, in which said pH range is above 9.

10. The process of claim 1, in which the temperature of the crystallizing solution is about 25°–750°C and the pressure is about 1 to 1000 atmospheres.

11. The process of claim 1 in which the pH is adjusted so that the $HS^-$ ion concentration exceeds 0.01 molal and the solubility of the metal sulphide exceeds about $10^{-5}$ molal.

12. The process of claim 11 in which the concentration of the $HS^-$ ion is approximately 5 to 10 molal.

13. The process of claim 1, in which the metal sulphide nutrient is HgS, the $HS^-$ ion concentration is 4–15 molal and the pH is 7–9.

14. The process of claim 13, in which the temperature is 150°–250°C and the temperature gradient is 10°–30°C.

15. The method of claim 1, in which said metal sulphide crystals are ZnS crystals, said metal sulphide nutrient is ZnS and said pH is 7–9.

16. The method of claim 1, in which said metal sulphide crystals are mercury sulphide and said metal sulphide nutrient is mercury sulphide.

17. The process of claim 1, in which said chemical potential gradient is $HS^-$ ion strength dilution.

18. The process of claim 1, in which said chemical potential gradient is pressure quenching.

19. The process of claim 1, in which said chemical potential gradient is oxidation.

20. The process of claim 1, in which said chemical potential gradient is temperature gradients.

* * * * *